E. KEITH.
Cotton Gin.
No. 17,155.
Patented April 28, 1857.
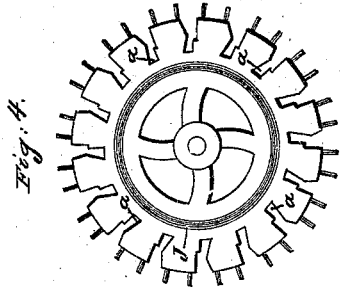
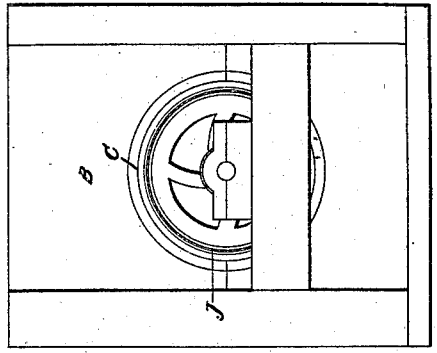
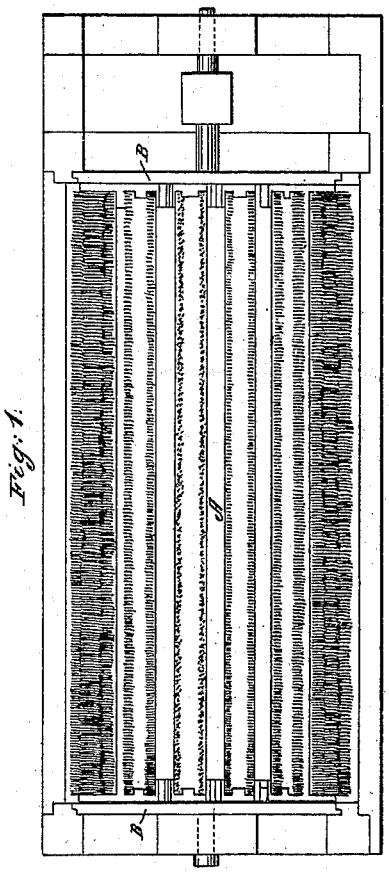
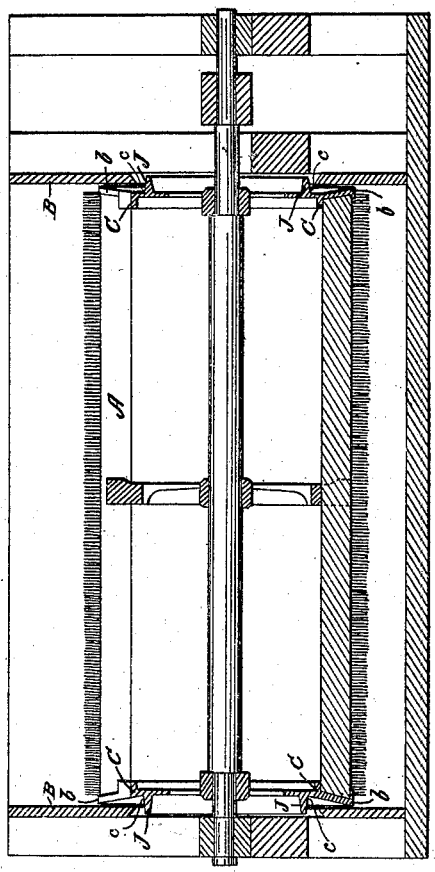

UNITED STATES PATENT OFFICE.

EDWIN KEITH, OF BRIDGEWATER, MASSACHUSETTS.

IMPROVEMENT IN BRUSHES OF SAW COTTON-GINS.

Specification forming part of Letters Patent No. 17,155, dated April 28, 1857.

*To all whom it may concern:*

Be it known that I, EDWIN KEITH, of Bridgewater, in the county of Plymouth and State of Massachusetts, have invented certain new and useful Improvements in Brushes of Saw Cotton-Gins, of which the following is a full, clear, and exact description, reference being had to the annexed drawings, making part of this description, in which—

Figure 1 is a plan; Fig. 2, a longitudinal vertical section through the same; Fig. 3, an end view of the brush, with its frame-work and side ceiling; Fig. 4, an end view of the brush.

On the 19th day of September, 1845, Letters Patent of the United States were granted to me for improvements in brushes for cotton-gins, the object of which improvements was to take the cotton from the saws in minute quantities and prevent it from being detached in bunches; also, to prevent any currents or eddies round the outsides of the brush-heads by which the fibers of cotton were carried into the interior of the brush-cylinder, and the latter was clogged and filled up.

My present invention has for its object the still further development of these ideas, and more particularly to prevent the entrance of the cotton between the brush-heads and the side ceilings, by which friction is produced to an amount oftentimes sufficient to set fire to the parts, whereby buildings and stock to a large amount are not infrequently destroyed. A double difficulty thus exists, arising, first, from the necessity of avoiding the currents of air round the ends of the cylinder by which the cotton is drawn out of the gin, and is afterward sucked into the interior of the brush, whereby the latter is filled up and clogged; second, from the impracticability of preventing these currents by causing the heads of the brush-cylinder to run in contact with the side ceilings, on account of the danger thereby run of firing the parts. These difficulties I have succeeded in removing by opening passages in the brush-heads between each pair of lags nearly down to the hoop J, and in inclining the heads away from the side ceiling from their exterior periphery toward the center, as will now be more fully described.

In the accompanying drawings, A is the brush-cylinder, which in its general construction resembles that represented in the aforesaid patent; B, the side ceilings, which are cut away in a circle, so as to come nearly in contact with the hoops J, projecting from the brush-heads C. When an open lag-cylinder with a central draft is employed, the pressure of the air within the brush-chamber tends to produce slight currents out between the ends of the brush-heads and the side ceilings. These currents carry with them more or less cotton and dust, which are drawn in by the central current into the interior of the brush, and the latter is thereby soon clogged and filled up, as before explained. When the attempt has been made to remedy the evil by causing the brush-heads to run in close contact with the side ceilings, sufficient heat was caused by the friction between the parts to set fire to the gin. These evils are all to be remedied by preventing the currents of air round the heads of the cylinders, and this I accomplish by opening passages *a*, Fig. 4, from the interior of the brush-cylinder through the brush-heads, by which means the general current of air within the brush-cylinder from its center to its circumference is allowed to extend itself out to the outside of the brush-heads and to sweep the side ceilings, and thus any counter-currents at this point are prevented. To render this still more effectual, the brush-heads are allowed to approach very near to the side ceilings at their extreme periphery only, as at *b*, Fig. 2, from which point the brush-head falls back away from the side ceilings to a point, *c*, Fig. 2, a little upward of one-third the distance from the periphery of the brush to its center or axis, or to the point where the hoop J is united to the head.

What I claim as my invention, and desire to secure by Letters Patent, is—

Inclining the heads of the brush-cylinder from the periphery toward the center, and opening the passages *a* through the heads, in the manner substantially as set forth.

EDWIN KEITH.

In presence of—
   I. DE HYDE,
   LAFAYETTE KEITH.